United States Patent [19]

Boyne

[11] Patent Number: 4,941,125
[45] Date of Patent: Jul. 10, 1990

[54] INFORMATION STORAGE AND RETRIEVAL SYSTEM

[75] Inventor: Walter J. Boyne, Alexandria, Va.

[73] Assignee: Smithsonian Institution, Washington, D.C.

[21] Appl. No.: 636,758

[22] Filed: Aug. 1, 1984

[51] Int. Cl.$^5$ .................. G06F 3/00; G06F 15/62
[52] U.S. Cl. .................. 364/900; 364/932.62; 364/952.31; 364/955.3; 364/963.4

[56] References Cited

U.S. PATENT DOCUMENTS

| | | | |
|---|---|---|---|
| 4,013,876 | 3/1977 | Anstin | 364/900 |
| 4,027,142 | 5/1977 | Paup et al. | |
| 4,041,463 | 8/1977 | Slutzky et al. | 364/900 |
| 4,090,223 | 5/1978 | Holt | 360/35.1 |
| 4,130,834 | 12/1978 | Mender et al. | 358/256 |
| 4,205,780 | 6/1980 | Burns et al. | 235/454 |
| 4,273,440 | 6/1981 | Froessl | 355/40 |
| 4,283,621 | 8/1981 | Pembroke | 237/375 |
| 4,310,751 | 1/1982 | Martin et al. | 235/92 MP |
| 4,400,777 | 8/1983 | Mori | 364/200 |
| 4,408,181 | 10/1983 | Nakayama | 82/61 |
| 4,408,301 | 10/1983 | Iida | 364/900 |
| 4,437,127 | 3/1984 | Hirose | 358/296 |
| 4,485,454 | 11/1984 | Kimoto | 364/900 |
| 4,503,556 | 3/1985 | Scherl et al. | 382/9 |
| 4,506,342 | 3/1985 | Yamamoto | 364/900 |
| 4,574,395 | 3/1986 | Kato | 382/61 |
| 4,641,203 | 2/1987 | Miller | 358/335 |
| 4,672,462 | 6/1987 | Yamada | 358/280 |

FOREIGN PATENT DOCUMENTS 0051226 5/1982 European Pat. Off. .

OTHER PUBLICATIONS

Patrick, E. A., et al., "Computer Controlled Picture Scanning with Application to Labeled Biological Cells," Compat. Bio. Med., Pergamon Press, 1972, vol. 2, No. 1, pp. 5-14.
European Search Report, 85305086.2, 5/18/88.
Modern Office & Data Management, vol. 20, No. 2, Mar. 1981; p. 34, AU; "Sophisticated System for Retrieving Records Captures User Interest" p. 34, right--hand col., lines 9-37.
Proceedings of SPIE, the International Society for Optical Engineering, Brussels, Jun. 25-28, 1984, vol. 490, pp. 39-42: G. Chauvin et al., "A Document Storage Application: the SARDE project".

Primary Examiner—Thomas M. Heckler
Attorney, Agent, or Firm—Sughrue, Mion, Zinn, Macpeak & Seas

[57] ABSTRACT

A digital camera is used to scan documents and generate a corresponding digital output signal. A data processor receives the digital output signal and generates corresponding index information. The video and index information are then stored on one or more optical disks for search and retrieval.

9 Claims, 1 Drawing Sheet

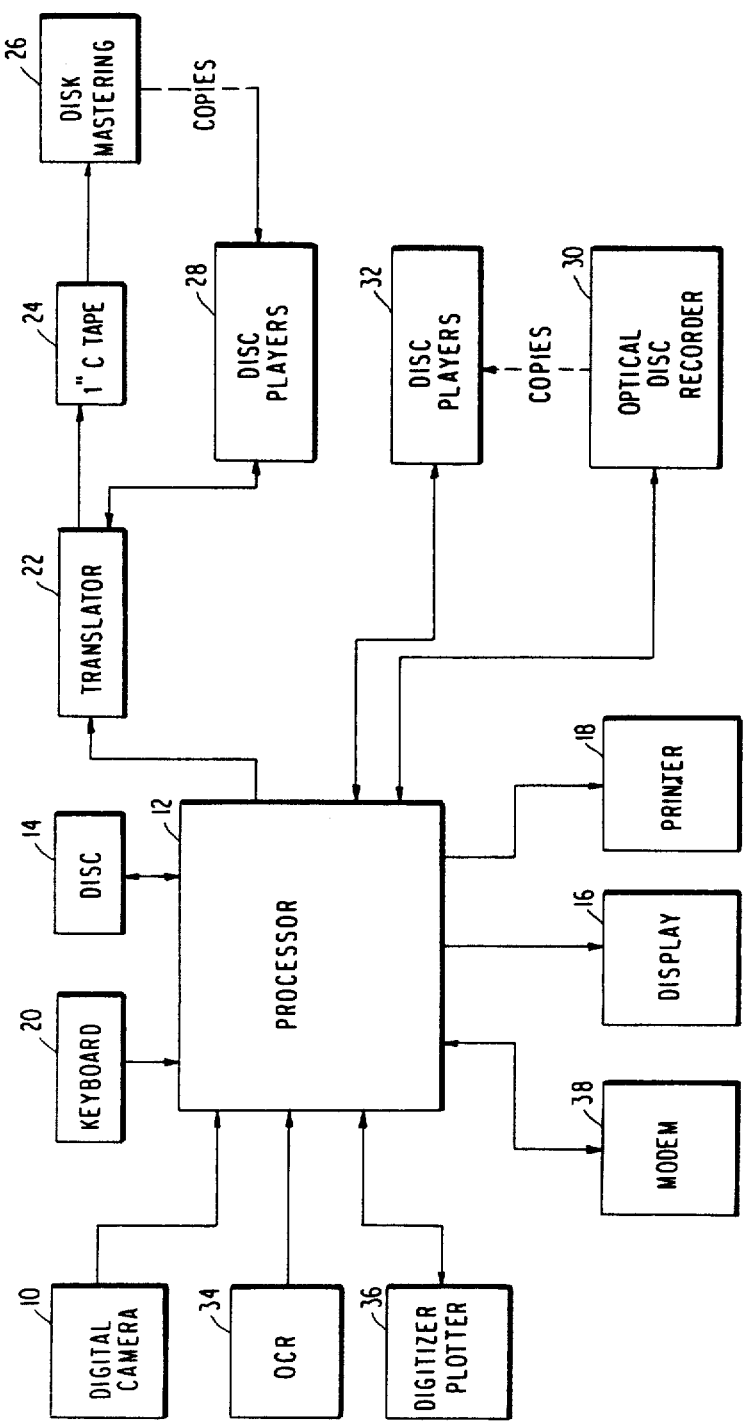

INFORMATION STORAGE AND RETRIEVAL SYSTEM

BACKGROUND OF THE INVENTION

This invention is directed to information storage and retrieval, and more particularly to a system for storage and retrieval of large quantities of documents which may include text, illustrations or combinations thereof. The invention is particularly useful in the archival storage of historical documents wherein it is desirable to maintain the integrity of the historical document, including its original appearance. As used herein and in the appended claims, the term "archival document shall be used to refer to a document containing textual information but wherein the appearance of the original document, and not merely the content of the text, is significant, and an "archival document storage system" or "archival document image storage and retrieval system" shall be used to refer to a system for storing and retrieving images of archival documents where the appearance of the original document is of interest to the user of the system.

In a conventional archival storage system, documents would typically be separated into files. In some cases, large quantities of documents would be stored with no practical indexing, so that reasonable access to the documents would not be available to any one but a few scholars who knew where to find them. An indexing system could be manually generated and researchers could access the stored documents through an index card file, but manual indexing systems have not proven entirely satisfactory.

When using an index card file system, it is still necessary to retrieve a document from the storage files in order to determine if it is relevant. If relevant, it is then necessary to obtain a photocopy or other reproduction of the document. These processes can take considerable time where a large number of documents are involved.

The handling of the documents contributes to the deterioration of the documents, which can be a long term problem in an archival storage system.

Still further, the complexity of manually generating an index card file system can itself be a disincentive for maintaining such a system when extremely large numbers of documents are involved.

It is desirable to provide some type of automated search capability, and it is known in some systems to index documents, e.g., by key words, and to permit automated searching. However, this facilitates only the searching aspect of the conventional system described above, and it is necessary to manually retrieve documents, to take the document to a photocopy station to obtain a copy of the document, and to manually generate the key words and phrases which will be used in the indexing system.

In at least one publicly available storage and retrieval system, i.e., the automated search system currently maintained by the U.S. Patent and Trademark Office for searching U.S. patents related to data processing, pertinent portions of the documents covered by the data base are stored on microfiche. Each document must be read by Patent Office personnel who will then assign that document to one or more descriptive headings. A system user can then key in a particular heading or a plurality of headings combined with logical operators, and the system will display from microfiche the stored portions of every document satisfying the search request. While such a system represents a substantial improvement over entirely manual systems, it is still not entirely satisfactory in a document storage and retrieval system employing very large numbers of documents, e.g., many millions of pages of text and drawing. The microfiche storage capacity is insufficient for such large numbers of documents, and the speed of retrieving the appropriate microfiche for display would also be unsatisfactory in a system of great size. Further, the pages of documentation are recorded on microfiche by a conventional photographic process, and there is no opportunity for the system to recognize the content of the documents being photographed. All key words and descriptive headings must therefore be manually entered. Still further, it is necessary for each viewing station to have its own set of microfiche, or at least for all viewing stations to be located immediately adjacent the microfiche file.

SUMMARY OF THE INVENTION

It is an object of the present invention to provide a storage and retrieval system which overcomes the above-described drawbacks.

It is a further object of this invention to provide such a system which is capable of storing very large numbers of documents in an efficient manner.

It is a still further object of this invention to provide such a system which will permit rapid automated searching of the stored documents, retrieval of the documents for display, and on-site printing of the documents while maintaining the integrity of the appearance of the original document.

It is yet a further object of this invention to provide a document storage and retrieval system wherein the requirement for manual data entry is minimized to substantially ease the burden of generating the desired document index.

It is a further object of this invention to provide a document storage and retrieval system wherein a remote user can access the data base for storage, retrieval and printing of documents including both printed text and drawings.

Briefly, these and other objects of the present invention are achieved by an archival mass storage and retrieval system using a digital camera to capture data in a digital form. The output of the digital camera is provided as an input to a general purpose digital computer which, in turn, is provided with an optical disk storage system. The digital information representing the object scanned by the digital camera is stored for subsequent retrieval on the optical disk together with appropriate index information.

The digital camera can thus be used to scan photographs, blueprints, pages of books, memos, etc., or even three-dimensional objects, and can accurately transform any of these into data which can be subsequently handled by the computer system. With all data in digital form, the documents can be transmitted to or from remote locations. The computer is preferably also provided with software necessary for recognizing text contained in the bit-map output of the digital camera so that, upon recognizing the content of any document, the appropriate index information can be automatically generated. The captured images and associated index information are then stored on an optical disk for future searching and retrieval. Retrieved documents can be displayed on the computer monitor and can be reproduced on any commercially available printer having graphics capability.

BRIEF DESCRIPTION OF THE DRAWING

The invention will be more clearly understood from the following description in conjunction with the accompanying drawing, wherein the FIG. 1 of the drawing is a block diagram of essential components of the storage and retrieval system according to the present invention, and FIG. 2 is a brief flow chart illustrating an efficient procedure for document capture and indexing.

DETAILED DESCRIPTION OF THE PREFERRED EMBODIMENT

A block diagram of the overall system of the invention is shown in the accompanying Figure. The system includes a digital camera 10 for scanning documents and converting the image information of each document to a digital information stream. The digital output of the camera 10 is provided to a processor 12, which may be any one of a number of suitable general purpose digital computers. The processor 12 receives the image information and preferably stores this information in a buffer storage, e.g., disk storage device 14. The processor 12 then generates the appropriate indexing information, with the help of additional data manually entered via keyboard 20, if necessary, and the multiple frames of image information together with the associated index information are stored on a digital storage medium in a manner to be described in more detail below. In a preferred embodiment of the invention, the digital storage medium will be an optical disk, although other types of high density storage devices would be acceptable. The index stored on the optical disk can then be searched by the processor 12 to obtain the addresses of frames having requested information. The disk locations can then be accessed to retrieve the video information for display on a display 16. If desired, the displayed video information can be reproduced via printer 18.

The individual components and their interaction will now be described in more detail.

With regard first to the digital camera 10, the camera should be a high resolution digital camera, such as a scanning-type CCD camera having a resolution of on the order of 3000×1500 pixels. One example of a suitable camera for use in this invention is the Model 610 camera available from DataCopy of Mountain View, California. The camera is available with a suitable software routine to permit the processor 12 to receive and process the digital output from the camera for either storage, display, printing or retransmission, e.g., to an optical disk recorder.

The video information provided by the camera 10 may represent a typewritten or handwritten document, a blueprint, photograph or even a physical object, and the output of the camera 10 will be a digital bit stream provided to the processor 12. The processor 12 may be any one of a number suitable general purpose digital computers, such as the PC XT microcomputer available from International Business Machines Corporation. The processor stores the digital video information in a disk buffer storage device 19. In the case of a typewritten document, the processor may be provided with software for converting the bit-mapped video information into ASCII character data, so that the processor can determine the information content of the text. Having determined the information content of the text, the processor employs appropriate software to generate the index and cross referencing information which can also be stored in buffer 14. The software should preferably be a self-index software program which will generate a data base index from full text, so that every word in the text will become a key word in the index. A suitable indexing software program would be the ZyINDEX program available from ZyLAB Corp. of Chicago, Illinois.

The text recognition software for recognizing text and generating ASCII characters from bit mapped image data is presently available and/or can be generated from commercially available software in a very straightforward manner. For example, commercially available OCR software in effect examines the bit map, or pattern of pixels, of the character image as a scanner moves across a page. Thus, the scanner momentarily "captures" the image of each character and recognizes each captured character image before going on to the next character. To recognize in software the characters represented by a captured digital image of an entire document, it is merely necessary to scan the digital image in the same manner as the original document would have been optically scanned by the OCR device. For example, the captured image could be displayed on a monitor, and a cursor, which may preferably cover substantially the same area as would be covered by an OCR scanner, may be moved across the monitor screen simulating the same scanning motion as an OCR scanner. The image portion covered by the cursor would be recognized by the OCR software in the same manner as is conventionally done. One example of OCR software suitable for modification for use in the present invention is the software used in the OMNI-READER optical character reader available from Oberon International having offices in Irving, Texas and London, England. The only modification necessary to this software would be to substitute the digital image information, from a region of the image covered by a cursor, for the image information signal which would normally be provided to the software from the scanner output.

Alternatively, software for recognizing text from bit mapped image data is available from Bell Northern Research, P.0. Box 3511, Station C, Ottawa, Canada.

If it is desired to utilize in the indexing routine additional key words for a particular document which are not found in the recognized text, such additional key words, e.g., category headings, titles, etc., can be entered via keyboard 20. For documents which are drawings or other images which cannot be recognized by the processor 12 or if the document is a typewritten document which has deteriorated to such an extent which precludes machine recognition, appropriate key words and/or titles will be entered via keyboard 20 for use in the indexing routine.

As described above, the preferred embodiment of this invention will use an optical disk storage, and the invention will be described in this context. However, it should be appreciated that other storage devices could be used, and that the invention is not limited to use with optical disk storage but is instead limited only by the language of the appended claims. The least expensive technique for optical disk recording is to generate a master disk from 1" C tape, with the image information being represented by analog signals. Accordingly, the digital information from the buffer storage 14 can be provided in the form of digital signal to a translator 22, e.g., such as available from Matrox Electronics Systems, Ltd. of Montreal, Canada, which preferably performs a simple D/A conversion to provide an analog video signal at its output. The analog video signal output from the translator 22 can then be recorded on standard video tape 24, e.g., of the type well known in the art. The indexing information would then be similarly provided through the translator 16 for recording on the tape 24. The order in which the video information and index information are provided for recordation on the tape 24 could be reversed, but it is preferable that all of one type of information be recorded followed by the other type rather than interleaving video and index data. The tape would then be used to generate a master disk in a disk mastering station 26, e.g., available from Phillips. With the video and indexing information recorded on different areas of the disk, it is a simple matter to designate certain track numbers as index storage area to facilitate accessing of the index information.

Since the index information is in ASCII format rather than bit-mapped image, it would also be possible to record the index information in digital form on the tape 24 and master disk. In such a case, the index information could be provided through the translator 22 without conversion, and the separation between image and index information on the optical disk could be indicated merely by noting the track number above or below which a digital signal format is employed.

After generating a desired number of disk copies, e.g., plural copies for distribution to remote accessing stations, a recorded optical disk may be placed in an optical disk playback device 28. This may, for example, comprise a standard laser disk player commercially available from several sources. The laser disk player could have an RS-232 or other suitable computer interface for coupling to the processor 12, and the disk player 28 can then be accessed and controlled by the processor 12. For search and retrieval, the operator would enter via keyboard 20 a key word to be searched, and the processor would then search the index information on the optical storage media to determine the disk location of any documents responsive to the key word inquiry. These locations would be sent back to the processor 12, which would then control the disk player to access each of the locations and retrieve the image data. The bit-mapped digital image data could then be displayed on a display (e.g., a monitor) sufficiently high resolution to display not only retrieved text but also detailed picture images, e.g., a vertical resolution of not less than approximately 1500 lines. Such monitors are available from a number of sources, e.g., DataCopy. If any of the retrieved documents are considered sufficiently pertinent, a copy thereof, either text or video image, or both, can be reproduced on a typical graphics-quality printer 18.

In one example of an application of the system of this invention, a large quantity of documents would be successively "photographed" by the camera 10, and the digital information would be stored in buffer storage 14. After storing a sufficient quantity of image data in the buffer storage 14, the processor 12 would provide the digital data for recording on high density storage media, e.g., either through translator 22 and tape 24 to the optical disk mastering station 26 or directly to a digital optical disk recorder. If documents are to be added to the system at a relatively slow rate, it may be satisfactory to perform the text recognition substantially simultaneously with the capturing of the image information by the digital camera 10. However, if large numbers of documents are to be captured and indexed, the most efficient procedure would be to successively capture the documents and to generate an optical disk, or indeed a plurality of optical disks, storing only the captured image information from the documents. After storing the digital image information, the images can be retrieved from the disk players and the index information can be generated at that time either by text recognition software or by entry of index information via keyboard 20, and the image data together with the corresponding index information can then be stored on a new set of optical disks. This operation is briefly illustrated in the flow chart of FIG. 2.

Thus, since the digital image information can be recognized later just as easily as at the time of original capture, the image capturing process need not be delayed while the indexing software and text recognition software are operating. Indeed, with the ability to recognize and index the captured images at a later time, it is possible to capture all of the document images on one processor while performing text recognition and indexing on another processor, thus subtantially enhancing the throughput speed.

Since constant changing of the optical disks may be impractical, the storage capacity may be increased either by using a multiple-disk player or by stacking a plurality of disk players and separately addressing each player. A suitable multiple-disk player is available from Mitomo Corporation and provides an expanded storage capacity of on the order of 50 individual disks. However, accessing speed would be improved by utilizing a plurality of separate players. Due to the present low cost of disk players, the second alternative may be preferable.

It should also be noted that, in either type of system employing multiple disks, it may be preferable to dedicate entire disks to index information rather than particular sections of each disk.

With regard to the optical disk recording, the embodiment of the invention reduced to practice employs the translator 22, 1" C tape 24 and disk mastering station 26. This requires that the translator perform D/A conversion when providing the information from the processor 12 to the tape 24, and it also requires that the translator 22 perform A/D conversion when image information is read from the disk player 28 and provided to the processor 12. However, optical disk recording technology has advanced to the point where the image data and index information could be recorded directly rather than via the tape 24 and disk mastering station 26. This would also permit elimination of the translator 22. Instead, the information from the processor 12 could be provided directly to a digital optical disk recorder 30, recorded in digital format, and played back through a digital disk player 32. However, present optical disk recorders are somewhat expensive and may not yet be justifiable from a cost standpoint.

In the preferred embodiment described above, the processor 12 is provided with appropriate software to generate ASCII code from bit-mapped image data, so that the indexing information could be automatically generated with minimal operator input. In those cases, such as drawings or unreadable text, where the processor 12 cannot generate its own indexing information, the necessary information could be entered via keyboard 20. In the case of unreadable text, it would normally be sufficient merely to enter a short description of the documents being recorded. However, in those instances where it is desirable to enter a substantial portion or all of the text, it may be preferable to have the text transcribed at some other clerical station and entered into the processor 12 via an Optical Character Recognizer (OCR) 34. Indeed, if the processor 12 is not provided with software for recognizing the content of the images provided from the camera 10, an OCR 34, e.g., of the type available from Kurzweil Computer Products, Inc., 185 Albany Steet, Cambridge Massachusetts, or DEST Corporation, 1201 Cadillac Court, Milpitas, California, can be used to read and recognize all or a substantial portion of the documents being stored.

It should be noted that the OCR is not used as a substitute for the digital camera, but rather only as a substitute for recognition software in the processor 12 which would otherwise be used to recognize the textual content of the digital camera output. In other words, the digital camera 10 is used in all instances to generate digital image information representing the document and this digital image information is eventually stored on the optical disk or other high density storage medium. The information generated by the recognition software in the processor 12, by the OCR 34, or by manual entry via keyboard 20, is used solely for indexing purposes.

For large drawings, e.g., blueprints, it would be possible to enter the image data via a digitizer/plotter 36 providing a digital bit-map output corresponding to the drawing. A suitable digitizer/plotter is available from XYZ TEK Corp., of Englewood, Colorado. The digitizer/plotter 36 could also be used to reproduce copies of blueprints and large drawings which may be impractical for reproduction on the printer 18.

A modem 38 may be coupled to the processor 12 for bidirectional communications. For example, image and/or index data could be generated at a remote location and transmitted to the processor 12 in a well-known manner. Further, the modem would allow the data base to be accessed from remote locations by researchers and scholars around the world. In response to a query received from a remote location, a particular document, which may be text or a drawing, could be sent via modem for remote display or remote printing.

System throughput may be enhanced using commercially available automated document positioning systems to permit rapid scanning of successive documents, in which case it would also be desirable to equip the camera 10 with an autofocus capability available from the camera manufacturer.

The system may also be enchanced by providing one or more portable data capture systems comprising a camera, a portable processor having a removable hard disk, and a simple display such as a flat panel plasma display. The image data could then be captured and transferred at a later date to the optical disk storage.

The document storage and retrieval system described above provides enchanced storage capacity while simplifying the indexing and improving accessibility to the stored information. The use of the digital camera 10 results in digitizing image information, making it possible to process the image information for recognition of the content, transmit both text and drawings to remote locations and print the documents on available graphics-quality printers. Most importantly, the system provides for automated storage and retrieval of documents with electronic reproduction of the documents in their original form and appearance, which renders the system highly advantageous in the archival storage of large numbers of historical documents.

It should be appreciated that various changes and modifications can be made to the specific embodiment disclosed above without departing from the spirit and scope of the invention as defined in the appended claims.

I claim:

1. An archival document image storage and retrieval system for storing image information representing the content of a plurality of archival documents, maintaining an index of descriptive terms and documents, and retrieving stored image information corresponding to a particular document in accordance with said index upon identification of a corresponding descriptive term, said system comprising:

a camera for generating electronic digital output signal representing the image of a document;

data processing means for providing a processor output representing both said image and index information corresponding to said document, said data processing means including means for receiving and storing said digital output signals from said camera representing a plurality of document images, means for retrieving said stored images from said means for storing after said digital signals representing said plurality of document images have been stored, means for recognizing the content of the images retrieved from said means for storing and producing recognition results, and means for generating said index information in accordance with said recognition results to thereby obtain said processor output; and digital optical storage means for optically recording said processor output.

2. An archival document image storage and retrieval system as defined in claim 1, further comprising a processor input means for providing a further input to said data processing means representing the content of a document, and wherein said data processing means further includes means for generating said index information in accordance with said further input.

3. An archival document image storage and retrieval system as defined in claim 2, wherein said processor input means comprises a keyboard.

4. An archival document image storage and retrieval system as defined in claim 3, wherein said processor input means comprises an optical character recognizer.

5. An archival document image storage and retrieval system as defined in claim 4, wherein said digital optical storage means comprises at least one optical disk for storing said processor output.

6. An archival document image storage and retrieval system as defined in claim 5, wherein said digital optical storage means comprises a plurality of optical disks.

7. An archival document image storage method for storing image information representing the content of a plurality of documents, maintaining an index of descriptive terms and documents for subsequent retrieval of stored image information corresponding to a particular document in accordance with said index upon identification of a corresponding descriptive term, said method including the steps of:

generating with a camera a succession of electronic digital output signals representing the images of a corresponding succession of documents;

recording said succession of digital output signals on a first storage medium;

after said succession of digital output signals have been stored, reading said succession of digital output signals from said first storage medium;

receiving said read digital signals in a data processing means, recognizing the content of at least a portion of said digital output signals from said first storage medium and producing recognition results, generating index information corresponding to each document in accordance with said recognition results and providing a processor output representing both the image of each document and the generated index information corresponding to each document; and optically recording said processor output.

8. A method according to claim 7, wherein said step of optically recording said processor output comprises optically recording said processor output on a second storage medium different from said first storage medium.

9. A method according to claim 8, wherein said first and second storage media are both optical disks.

* * * * *